United States Patent [19]

Davis

[11] 4,136,668

[45] Jan. 30, 1979

[54] SOLAR HEAT STORAGE AND UTILITY SYSTEM

[76] Inventor: Ariel R. Davis, 3476 Fleetwood Dr., Salt Lake City, Utah 84111

[21] Appl. No.: 786,001

[22] Filed: Apr. 8, 1977

[51] Int. Cl.² ............................................. F24J 3/02
[52] U.S. Cl. .................................... 126/270; 126/400; 237/1 A
[58] Field of Search ................. 165/6, 8, 18; 237/1 A; 126/270, 271, 400

[56] References Cited

U.S. PATENT DOCUMENTS

| | | | |
|---|---|---|---|
| 1,697,591 | 1/1929 | Dowd, Jr. | 165/6 |
| 2,677,367 | 5/1954 | Telkes | 126/400 |
| 3,064,418 | 11/1962 | Sanders | 126/270 |
| 3,908,632 | 9/1975 | Poulsen | 126/271 |
| 3,946,721 | 3/1976 | Keyes et al. | 126/400 |
| 3,960,207 | 6/1976 | Boer | 126/400 |
| 3,972,316 | 8/1976 | Alkasab | 126/271 |
| 4,054,125 | 10/1977 | Eckels | 126/271 |

*Primary Examiner*—Kenneth W. Sprague

[57] ABSTRACT

A solar heat storage and utility system wherein heat storage means is mechanically conveyed from an energy receptor area to a storage or other utility area. A series of enclosures containing heat storage media are intercoupled to and between endless connectors, such as sprocket chains, that are routed for heat absorption and also storage and/or use as required. The heat storage elements preferably take the form of tubes which are caused to rotate as they roll downwardly on their rails at the absorption area, thereby offering different sector surfaces to accomplish a rapid heating of the elements in which the heat storage media is contained. The system is self-contained in a primary or ancillary building enclosure. Means are provided to optimize energy reception and storage.

8 Claims, 7 Drawing Figures

FIG. 2

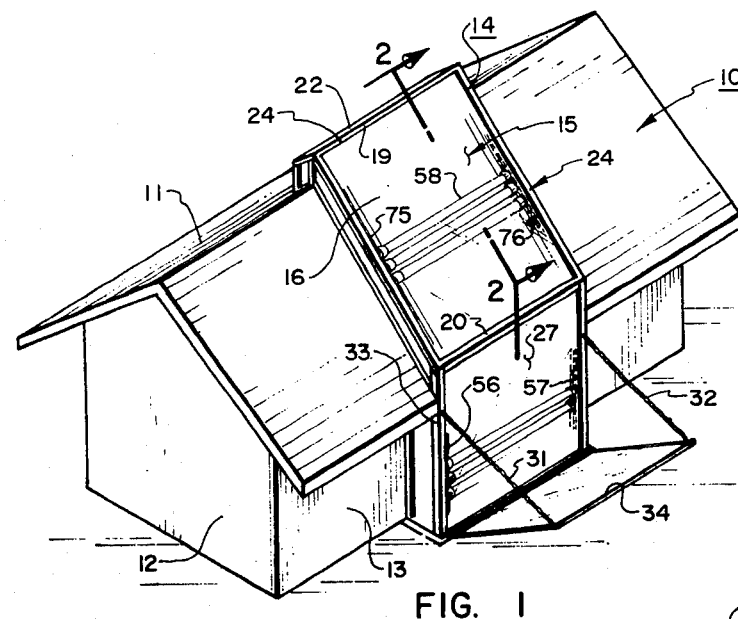
FIG. 1
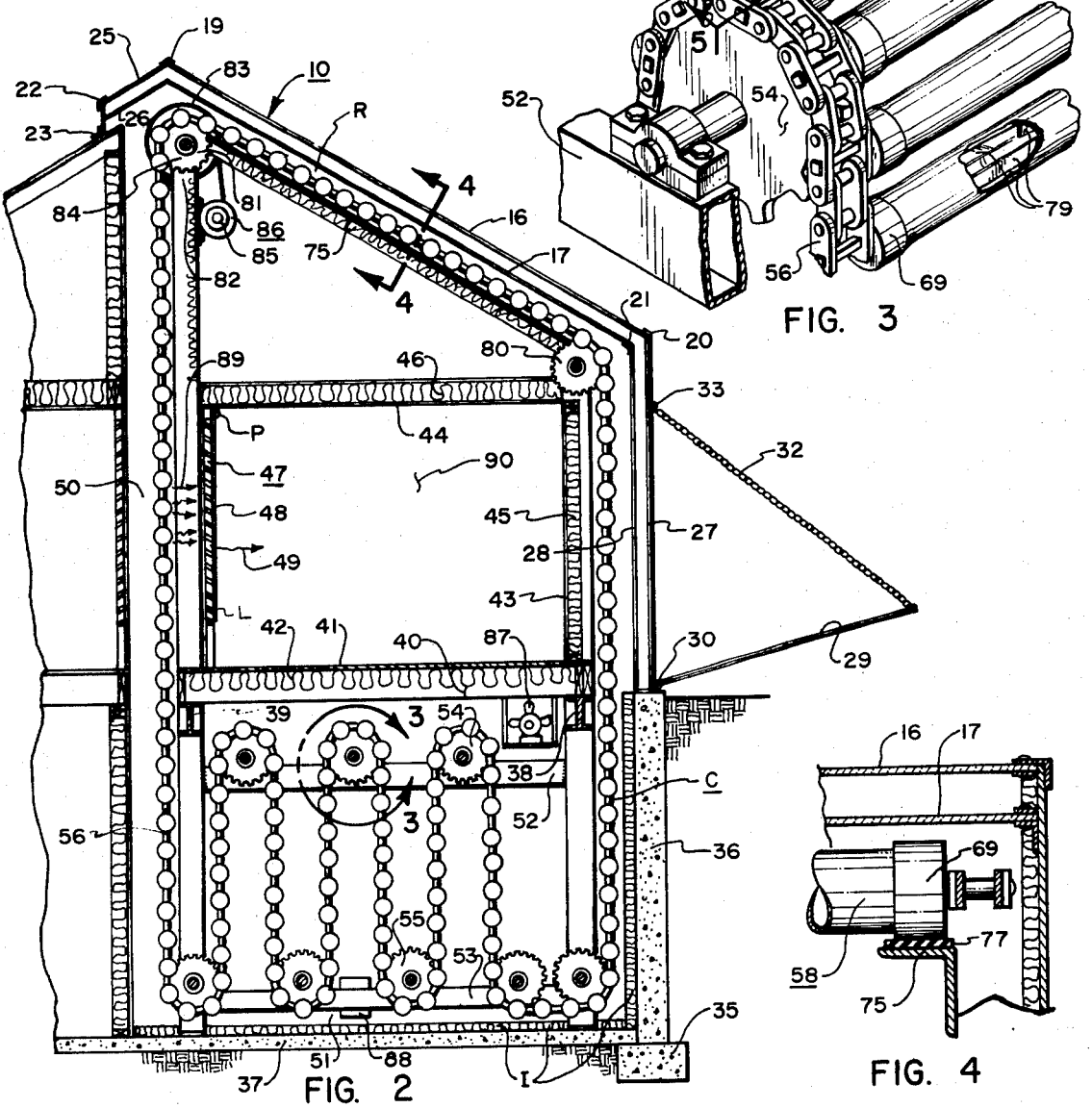
FIG. 2
FIG. 3
FIG. 4

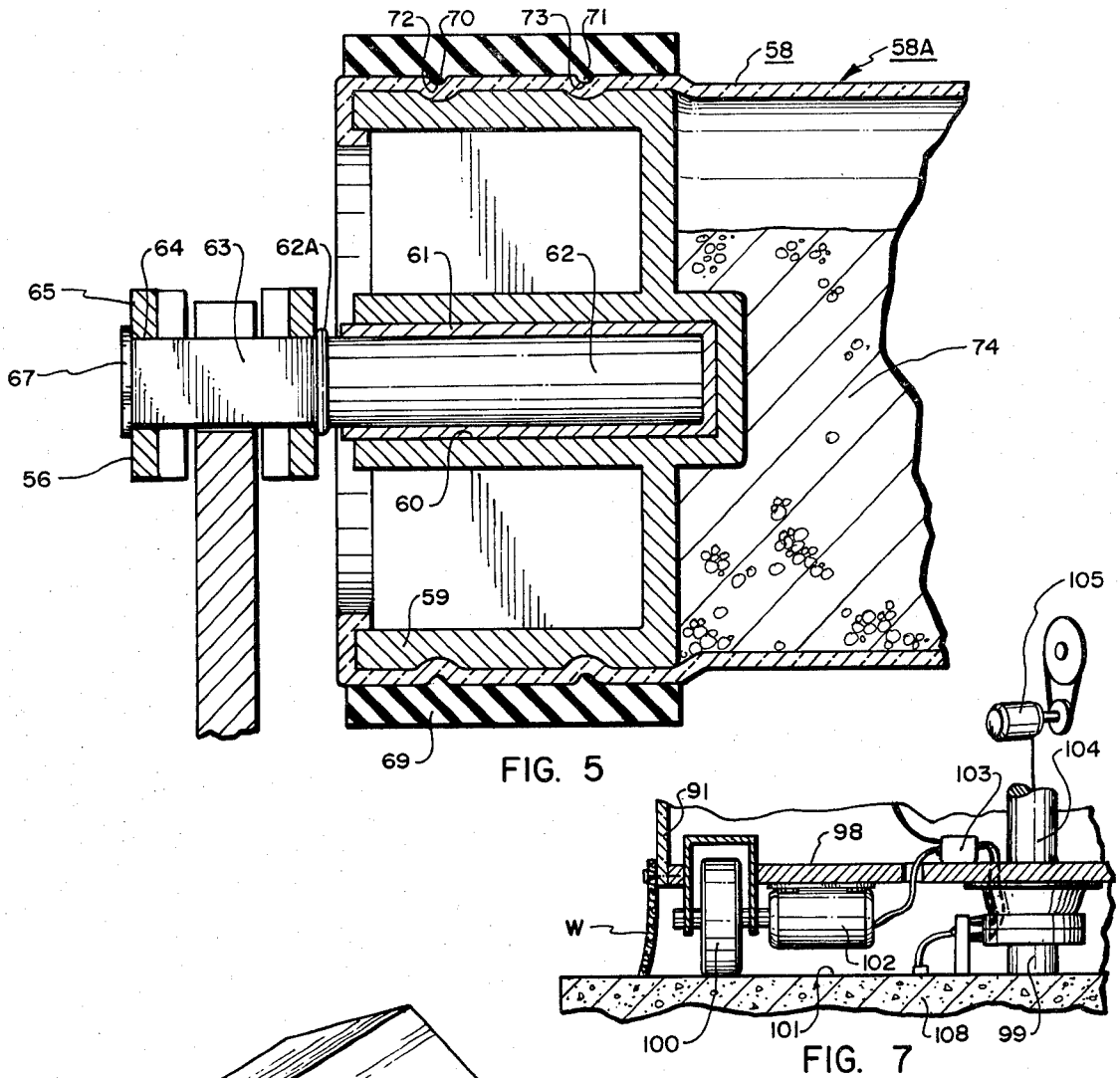
FIG. 5
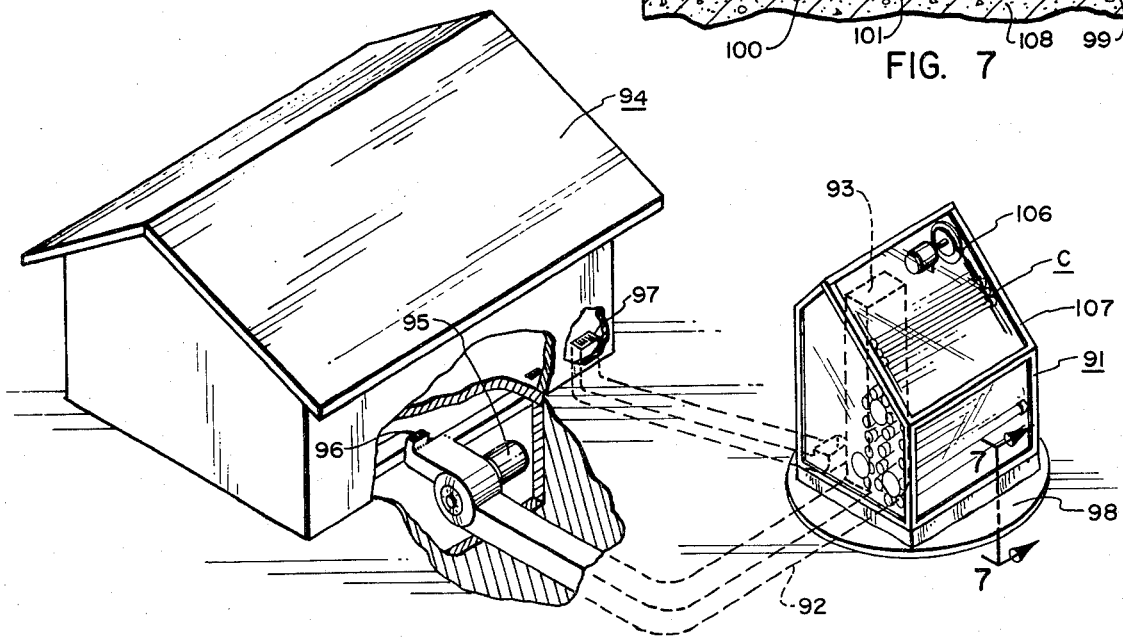
FIG. 7
FIG. 6

SOLAR HEAT STORAGE AND UTILITY SYSTEM

FIELD OF INVENTION

The present invention relates to heat storage systems and, more particularly, to a solar-energy heat-storage system wherein heat storage elements are mechanically conveyed from a storage and utility area to one or more energy receptive areas.

DESCRIPTION OF PRIOR ART

Presently there is a great deal of interest, worldwide, in devising suitable means for capturing the energy of the sun's rays and storing such energy as heat at or near building sites, such heat being usable for interior space heating for the comfort of occupants, for example. Prior methods of heating include the pumping of air through rock bins, rock storage piles, or rocks surrounding water tanks. Other systems take the approach of circulating a fluid, via plumbing and suitable pumping means through an energy receptor area, such as translucent, panel-encased heat-collector means, i.e. pipes or conduit, and then routing such circulated fluid down into a heat storage pool or tank.

Both of these methods have serious disadvantages. In the first place, pumps and circulating conduit are very expensive and are apt to malfunction, particularly during cold-weather periods. Also, water and rock storage is very bulky and expensive to install. Finally, the requirement of forcing air through piles or bins of rock requires a great deal of excess energy, owing to the resistance to air flow of comminuted or particalized rock.

Some interesting work has been done by Dr. Maria Telkes of the University of Delaware, see a representative publication in the ASHRAE journal, Sept. 19, 1974, wherein heat storage material such as certain salt hydrates have been recommended for certain types of heat storage. Where such material is stored in bulk, heat transmissivity through the material is very limited, and secondary heating thereof by independent plumbing leading to a roof collector is still required. Salt hydrates of acceptable form are impractical to circulate, notwithstanding the fact that a general approach of utilizing the heat of fusion temperature range and crystallization phenomena taking place thereat is essentially a thoroughly sensible approach.

BRIEF SUMMARY OF THE INVENTION

According to the present invention, the underlying and novel approach taken is to convey heat storage means, including the series of containers thereof, from a storage and/or use area to the energy receptor area of a primary or ancillary building structure. In a preferred form of the invention, a series of tubes containing heat-storage media are conveyed to a sunlight receptive area, are automatically rotated about their individual axes during presence in such area, to obtain uniform heating of the heating tubes supplied; then the tubes are returned to a basement storage area for storage and utility. It is, of course, impractical to convey a heat storage rock pile from the basement of the building to the roof and then back again. Furthermore, plumbing as aforementioned is subject to possible malfunction and involves appreciable expense as well as heat transmission loss.

In the present invention, the heat storage media encased in movable tubes or other enclosures, is mechanically transported up to the roof area, for example, to receive solar energy, and then back to the basement or storage region in a space-condensed, serpentine configurement. Fan or blower means may be provided at the heat storage region to convey heated air to desired areas of the building. The upward run of the several tubular enclosures used may be positioned, for example, near a louvered wall for supplying radiant heat to a room area. Rails are provided at the collector or heat-receptor region so as to ensure an automatic rotation of the heat media tubes as these progress and roll downwardly underneath the translucent panels thereat. Side heat receptor areas may be provided with reflectors, as needed. A principal building can likewise be supplied with an auxilliary structure containing the heat storage system of the invention, which auxiliary structure may be rotated or otherwise moved for optimum results in accordance with the sun's position.

OBJECTS

Accordingly, a principal object of the present invention is to provide a new and improved heat receiving and storage system.

A further object is to provide structure requiring a minimum of energy for conveying its heat storage elements to and from a solar energy receiving area.

A further object is to provide a solar energy heat storage system wherein storage means is mechanically routed to and from the energy receiving position accommodating the system.

A further object is to provide the heating system, in a primary or auxilliary building, wherein the same can be used to collect solar energy and store heat appropriately, this by actually mechanically moving progressively the heat storage medium.

A further object is to provide new and improved heat storage structure.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

BRIEF DESCRIPTION OF THE DRAWINGS

FIG. 1 is a perspective view of a building incorporating the heat storage system of the present invention.

FIG. 2 is an enlarged, fragmentary, vertical section taken along the line 2—2 in FIG. 1.

FIG. 3 is an enlarged detail, fragmentary and in perspective, of a representative one of the opposite sprockets accommodating the mounting, at opposite ends, of the heat storage tubes, with their endless connectors; the structure at FIG. 3 is typical of all the sprockets, for example, that are used in the invention.

FIG. 4 is an enlarged fragmentary section taken along the line 4—4 of FIG. 3, illustrating the manner in which a representative end of a representative heat storage tube frictionally engages suitable means along its rails for progressively rotationally advancing each respective tube as the same rolls downwardly along its rails underneath the translucent heat receptor structure of the invention.

FIG. 5 is an enlarged fragmentary vertical section taken along the line 5—5 in FIG. 3, and illustrates representative one of the opposite ends of the heat storage tubes with their associated structure and endless conveyors.

FIG. 6 is a perspective view of a building including an auxilliary structure incorporating the heat collector and storage structure of FIG. 2.

FIG. 7 is an enlarged fragmentary section taken along the lines 7—7 in FIG. 6, illustrating one means by which the structure of FIG. 6 may be revolved periodically.

DESCRIPTION OF PREFERRED EMBODIMENTS

In FIG. 1 structure 10 forms an enclosure comprising a dwelling structure such as a residence, office building, or other utility or storage structure. The same will, of course, include roof 11 and a series of sides such as at 12 and 13. A radiant energy receptor structure 14 is included within the structure 10 and forms a sunlight receiving area 15, as defined by a series of translucent panels 16 and 17 which are secured in place and mounted at structural angles 19-23. Angles 19-23 are part of the rigid framework 24 which is secured to the roof and side structure for providing support for the various translucent panels, not only at 16, 17, but also at 25, 25, and 27, 28. The translucent panels may be, of course, of glass or any translucent plastic material. Light reflective means 29 may comprise an aluminum panel reflector that is hinged by panel hinge 30 to the remainder of the structure. A pair of travel limit chains 31 and 32 are secured to framework structure 33 and the margin 34 of the light reflective means 29 so as to limit the latter's travel and appropriately position the panel for proper receipt and reflection of sunlight from the exterior into region R that contains the heat collector or heat storage means hereinafter described.

Where the enclosure takes the form of a dwelling, see FIG. 2, for example, then the same generally will include the usual foundation footings 35 and foundation walls 36, one of each being shown. A slab 37 is poured in the usual way, insulation I is provided, and beams 38 and 39 will be supported by the basement walls 36 in the usual manner. Floor joists 40 support flooring 41 which is insulated from the underneath side by suitable batting or other insulation material 42. The walls and ceiling as at 43 and 44 are installed in the usual manner and insulated by batting or other means at 45 and 46. The inner wall at 47 is louvered and may be fixed or made adjustable by conventional pivotal louvered structure P as is common with louvered or venetian blinds. The louvers L are insulated where desired. In any event, there will be louver spaces 48 accommodating the reception of radiant heat in the direction of the arrow 49 from the heat storage means 58A within travel space 50, further hereinafter described.

The basement area 51 will be provided with suitable horizontal framework support means 52 and 53 for journalling a series of sprockets 54 and 55 located at the various points, top and bottom, within the basement area as shown. It will be observed that the sprockets as at 54, 55 will be disposed in identical, horizontally spaced, opposite side patterns, to accommodate the endless connectors 56 and 57, see FIGS. 1 and 2. These endless connectors may comprise a pair of vertically oriented, mutually horizontally spaced sprocket chains, chains 56 and 57 being identical. These chains support the rigid heat storage means 58A which, see FIG. 5, preferably comprise heat storage tubes 58 having end bells 59 that may be machined or simply cast. End bell 59 includes a central elongate aperture 60 receiving an Oilite or other type of preferably self-lubricating bearings 61. The bearing or bushing may simply be pressed home in the aperture 60 as seen.

Journal shaft 62 is disposed in the bearing and includes a raised medial annular protrusion 62A and also an outer end portion 63. The latter may assume any shape within a preferred embodiment, e.g. simply squared, or be of polygonal cross-section, for insertion in corresponding aperture 64 of a respective chain, e.g. 56, at a chosen link 65 thereof. The shaft end 67 can simply be enlarged to provide for a retentive securement of the journal shaft 62 relative to a respective chain 56. It will be understood that the opposite ends of each heat storage tube 58 will be secured to and supported by opposite sprocket chains 56, 57 in an identical manner.

A rubber or other elastomeric encasement or tire 69 can circumscribe each of the opposite ends of tube 58 and can be secured in place by molded protrusions 70 and 71 disposed in annular slots 72 and 73 of the tube. These slots may be formed actually by crimping the tube onto the respective end bells 59 positioned at opposite ends of such tube. Each of the essentially rigid heat storage means 58A, comprising the tubes 58 and their respective associated structures, as shown, will generally include a heat storage medium as at 74. High heat absorption and storage can be obtained when the substance of the heat storage medium 74 will operate at its heat-of-fusion temperature, or in this range. One substance that might be employed at 74 is a substance known as glauber salts, i.e. sodium sulfate decahydrate ($Na_2SO_4.10\ H_2O$) plus a crystalline agent such as borax, or the substance known as Hypo, i.e. sodium thiosulfate pentahydrate ($Na_2S_2O_2.5H_2O$) plus a crystallizing agent, also such as borax.

In a preferred form of the invention the radiant energy receptor structure 14 includes, underneath translucent panels 16, 17 a series of rails 75, 76 over which the heat storage tubes 58 will roll. The upper surfaces of these rails 75, 76 will include a respective friction surface or friction element 77, see FIG. 4 by way of example, which will frictionally engage the outer surfaces of opposite end cap 69, see FIG. 5, and thus cause the tubes 58 to revolve as they are advanced angularly downwardly, see FIG. 2. Thus, movement of the heat storage tubes in the area of the translucent panels 16, 17 will be accompanied by an axial rotation of these tubes so that these may present different surface sectors to the oncoming sunlight. This will measurably increase the effectiveness of the tubes so that all surface areas or area sectors of the tube and the heat storage medium contained therein will be solar heated.

Where desired, each of the tubes, see FIG. 3, may be extruded to include inner radial fins 79, for example, see FIG. 3, to improve heat conductivity to the tube interiors. It is to be noted that the fluid/crystalline substance at 74 is non-circulating, i.e. simply a stationary fluid within the tube requiring no plumbing connection to such tube.

In manner of assembly, for example, one of the end bells can be emplaced in a tube 58 and then the tube filled appropriately with the glauber salts or other solution; subsequently the remaining end bell is installed, thus enclosing the eutectic substance.

Suitable, mutually horizontally spaced sprockets 80, one being shown in FIG. 2, are journalled and supported by fixed structure as at 52, for example, see FIGS. 2 and 3, and are provided for advancing the tubes and their endless connectors in the manner shown by the path arrows in FIG. 2. Likewise, a drive sprocket 81 is journalled at the upper portion of framing 82 and includes an enlarged hub 83 which is coupled by belt 84 to the drive 85 of drive motor 86. Accordingly, an electrical circuit supply will be supplied the motor 86 for driving the connectors 56, 57 with their heat storage tubes connected to and disposed therebetween. It is noted that all of the sprockets in the basement area of FIG. 2 are so disposed that a serpentine configuration of the endless conveyors and their tubes at this point are routed in a serpentine configuration. This provides for a maximum heat storage at this basement, or other heat storage region, without either interrupting unduly the air flow or requiring an excessively large space for such heat storage. An electrically operated fan 87 and cold air-return 88 may be provided so that the fan serving as a blower can either blow air or draw air from the basement area to heat desired portions of the dwelling. Radiant heat energy as shown by the arrows 89 may proceed through the spaces 48 of the louvered walls to supply radiant heat to a room area 90, see FIG. 2. These louvers can be closed when desired by conventional movable louver structure, abbreviated at P.

The entire system of sprockets, endless connectors, and tube storage means in FIG. 2, may be designated simply as a heat collector and storage system C.

FIG. 6 illustrates that such storage system C can be disposed in its entirety in a separate or auxilliary structure 91, see FIG. 6, which will be supplied an insulated duct 92 and also a return duct 93, both being coupled to the dwelling structure 94 in the manner illustrated in FIG. 6. A blower can be supplied as at 95 for connecting the ductwork 92 and drawing heated air therethrough to suitable heat registers 96 in the dwelling. A cold air return at 97 will be connected to the ductwork 93 to lead back into the structure 91 to complete the airflow circuit.

Where desired, structure 91 may be mounted on a rotatable support 98, the latter being journalled for rotation on a fixed post 99 and provided with a roller or wheel 100 which rolls over the upper surface 101 of concrete support pad 108. Wiper W can be included. Motor 102 may be provided and mounted as shown to drive wheel 100 about its travel circle, the motor being connected through commutator means 103 to an electrical source 104. The latter also couples to motor 105 which drives the pulleys or hub 83, also found at the top of enclosure structure 91 by virtue of the former's inclusion in system C.

Accordingly, when desired, the auxilliary structure can be used exterior to the house to provide the heat required for the dwelling 94.

In operation, the system C collects heat from the sunlight (1) at panel areas 16, 17, see FIG. 2, and also 27, 28; where the auxilliary structure 91 is employed, (2) through the translucent panels 106 enclosed at several areas in the framework 107 thereof. The heat storage means comprising the tubes 58 with their ancillary structure collect heat and are conveniently moved via the continuous or, generally, intermittent operation of drive motor 86 in FIG. 2. It is to be noted that as the tubes move downwardly over their rails as at 75, 76 in FIGS. 1 and 2, the tubes are rotated so as to face other surface sectors of the tubes to the oncoming sunlight. Once the tubes are heated, then additional tubes are advanced upwardly to take advantage of the receptor area R and the incoming sunlight thereat. Radiant energy absorption is further enhanced by the provision of translucent panels 27, 28, these in conjunction with the light reflective means 29 provided. Tubes thus proceed to the basement storage area at 51 where heat is stored for transport to other occupancy areas either by virtue of fan 87 or the upward transport of the tubes immediately to the left of the louvered wall 47, supplying radiant heat at 89.

It is noted that the same operation will inhere in the ancillary structure at 91 in FIG. 6, but this kind of blower will draw air from the structure 91 when needed and pump it into the house or other structure at 94.

In essence then, the present invention provides a means whereby the heat storage means, instead of remaining stationary as in the usual case, is actually moved by virtue of the endless connectors and heat storage tubes described so that alternate portions of the system are exposed to oncoming sunlight, with the serpentine configuration at the bottom of the dwelling or auxilliary structure, being operative to combine heat storage to a small area in a manner as to offer the least resistance to airflow.

The term "rigid" as applied to the heat storage means or tubes is employed simply to differentiate from bare fluid conveyance as by fluid pumping means, for example, as used in the prior art.

It is of interest to note that the heat receiving and storage system C is essentially weight-balanced, so that the sole energy required will be that needed to overcome the friction of the support sprockets as at 54, 55. This is because the left-hand run of heat storage tubes at area 50 is counterbalanced by the descending tubes at area R in FIG. 2.

Throughout the description and claims herein, the term "translucent" shall also comprehend and include "transparent". It is also to be noted that the heat storage tubes, preferably having a dull, dark finish for maximum light to heat conversion, need only be actuated intermittently, as desired, since they will amply heat, even on a winter day, when they are stationary at the solar energy receptor area.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the true spirit and scope of the invention.

I claim:

1. In a building structure having an occupancy area, a basement heat-storage area disposed at a level underneath said occupancy area, and an upper, radiant energy receiving area, a pair of mutually spaced endless connectors passing into and through said basement heat-storage area and also circumscribing said occupancy area, a series of mutually spaced, elongate, heat storage elements interconnected to and between said endless connectors, means for supporting for movement said endless connectors, and means for progressively driving said endless connectors whereby to advance said heat storage elements toward, proximate, and past said radiant energy receiving area.

2. The structure of claim 1 wherein said building structure includes translucent panelling essentially defining said radiant energy receiving area.

3. The structure of claim 1 wherein said supporting means are mutually spaced in said basement area whereby to define a serpentine configurement and travel path for said heat storage elements at said basement area.

4. The combination of claim 1 wherein said structure includes air current producing means disposed proximate said heat storage elements in said basement area.

5. The combination of claim 1 wherein said occupancy area is provided with at least one louvered wall proximate to and separating said heat storage elements from said occupancy area.

6. The combination of claim 1 wherein building structure includes a roof having translucent panel means defining said radiant energy receiving area, a second radiant energy receiving area also communicating with said heat storage elements, and a light reflection means proximate said second, radiant energy receiving area.

7. The combination of claim 1 wherein said heat storage elements are pivotally mounted to said endless connectors, said radiant energy receiving area including rails onto and over which said heat storage elements move in rolling contact.

8. The structure of claim 7 wherein said endless elements comprise sprocket chains, said heat storage elements being journalled to said sprocket chains.

* * * * *